(12) United States Patent
Kallman et al.

(10) Patent No.: US 6,724,847 B1
(45) Date of Patent: Apr. 20, 2004

(54) FEED-FORWARD SYMBOL SYNCHRONIZER AND METHODS OF OPERATION THEREFOR

(75) Inventors: Kurt Albert Kallman, Mesa, AZ (US); Daniel James Knollmueller, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 729 days.

(21) Appl. No.: 09/656,006

(22) Filed: Sep. 6, 2000

(51) Int. Cl.$^7$ ................................................ H04L 7/00
(52) U.S. Cl. .................. 375/355; 375/362; 375/354; 329/345; 370/503
(58) Field of Search ................... 375/354, 355, 375/362, 226; 370/503, 509; 329/345

(56) References Cited

U.S. PATENT DOCUMENTS

| | | | | |
|---|---|---|---|---|
| 5,671,257 A | * | 9/1997 | Cochran et al. | 375/355 |
| 5,764,102 A | | 6/1998 | Cochran et al. | 329/304 |
| 5,960,044 A | * | 9/1999 | Montreuil | 375/322 |
| 6,075,408 A | * | 6/2000 | Kullstam et al. | 329/304 |
| 6,154,510 A | * | 11/2000 | Cochran et al. | 375/371 |
| 6,218,896 B1 | * | 4/2001 | Becker et al. | 329/304 |
| 6,466,630 B1 | * | 10/2002 | Jensen | 375/327 |
| 6,525,523 B1 | * | 2/2003 | Soma et al. | 324/76.77 |

* cited by examiner

*Primary Examiner*—Mohammad H. Ghayour
*Assistant Examiner*—Aradom B. Merid
(74) *Attorney, Agent, or Firm*—Frank J. Bogacz (57) ABSTRACT

A feed-forward symbol synchronizer (200, FIG. 2) samples symbols transmitted within one or more packets that form a burst of radio frequency (RF) energy. The symbol samples (209) are delayed in a data delay buffer (214) while a phase estimate (212) is generated for each packet. A resampler (218) resamples the delayed symbol samples based on the phase estimate, resulting in resampled data (228) that includes one sample per symbol. The resampled data is clocked into a dual-port RAM (230) using a resampling clock that is also based on the phase estimate. The resampled data is then clocked out of the dual-port RAM and into a demodulator (238) using the receiver's symbol clock (232). Also described are methods of operating the feed-forward symbol synchronizer.

20 Claims, 3 Drawing Sheets

FEED-FORWARD SYMBOL SYNCHRONIZER AND METHODS OF OPERATION THEREFOR

TECHNICAL FIELD

The invention relates generally to digital demodulators and, more specifically, to digital demodulators that recover data conveyed in a stream of symbols within a received wireless signal.

BACKGROUND OF THE INVENTION

In a wireless, digital communication system, a transmitter modulates a stream of data and transmits the modulated signal to a receiver. The transmitter modulates the data by converting it to symbols, where a symbol is a discrete interval of time within which the transmitted signal conveys a unit of data (i.e., one or more bits) in the form of a magnitude and a phase. The transmitter modulates the data based on a symbol clock, which is local to the transmitter, where the symbol clock rate is some fraction of the data rate.

Upon receipt, a receiver recovers the data by demodulating the received signal. Many of the receiver's demodulation elements (e.g., the carrier loop, unique word detector, interleavers, data decision modules, and Viterbi decoders) are clocked using the receiver's symbol clock. The receiver's symbol clock and the transmitter's symbol clock are separate. Therefore, the phases and the frequencies of the transmitted symbols and the received symbols usually are slightly different.

In addition, in some systems, the transmitted signals are prone to significant frequency offsets, such as offsets caused by Doppler shifts. For example, in a satellite communication system where the satellites move with respect to ground-based transmitters, Doppler shifts can substantially offset the frequency of signals transmitted by ground devices to the satellites, and vice versa.

Symbol synchronization involves compensating for frequency and phase offsets imposed upon the signals between the transmitter and the receiver. Some prior art systems address the frequency and phase offset problems using some type of phase locked loop (PLL) circuit. In these systems, a voltage controlled oscillator (VCO) is employed to modify the sampling rate of the received signal, where the sampling rate is controlled by a sampling clock at the receiver. In addition, the output of an interpolation filter, which is used to resample the incoming data, is controlled by a symbol clock that is phase locked to the received data stream.

In some cases, however, it may be undesirable to use a VCO in the synchronization loop. One reason is that a VCO generally produces harmonics, which may interfere with other system components. If a VCO is undesirable, the symbol clock may instead be derived directly from a sampling clock using a simple state machine. The resulting clock rate will have an average frequency equal to the symbol rate, but a non-uniform duty cycle. One drawback to this solution, however, is that both the sampling clock and the symbol clock are fixed in frequency and cannot be adjusted to track the frequency of an incoming Doppler shifted signal. This solution, therefore, is not adequate when received signals are susceptible to Doppler shifts.

What are needed are apparatus and methods that provide accurate symbol synchronization in the presence of significant frequency offsets. Particularly needed are apparatus and methods that enable a receiver, which receives Doppler shifted signals, to demodulate received symbols without the use of a VCO.

DETAILED DESCRIPTION

Embodiments of the present invention provide a symbol synchronizer that synchronizes received data with a symbol clock by rate buffering the output of a resampler, which includes an interpolation filter. In one embodiment, this is accomplished by first clocking the received data out of the resampler and into a buffer such as a dual port random access memory (RAM) using a clock, referred to herein as a "resampling clock," which is synchronized to the phase of the received symbols. The data is then clocked out of the RAM using the receiver's symbol clock, which is also used to clock the demodulator. This and other embodiments will be described in detail below.

Because symbol data is most accurately represented at the center point of the symbol, it is important to account for phase and frequency offsets by synchronizing the transmitter's symbol clock to the receiver's symbol clock. In one embodiment, this is done by the receiver oversampling the incoming signal and then determining a sample at approximately the center point of each symbol.

To accomplish this, an analog to digital (A/D) converter in the receiver oversamples the incoming demodulated signal at a sampling rate that is some rational multiple of the symbol rate. The sampling clock has a uniform duty cycle, and the sampling rate typically is a whole or fractional value within a range of two to ten times the symbol rate. Thus, for example, if the sampling rate is exactly three times the symbol rate, then the A/D converter would produce three samples per symbol.

Generally, the sampling clock will have a phase that is not related to the symbol timing (e.g., it is not synchronized with the incoming symbols and is not an integer multiple of the symbol rate). For example, a particular system may sample at a rate of 2½ times the symbol rate. In such a system, two samples may be taken for the first three symbols within a data stream, then three samples may be taken for the fourth symbol. Thus, where the sampling clock phase is not related to the symbol timing, the symbol clock, which is derived from the sampling clock, has a non-uniform duty cycle.

In one embodiment, after the initial oversampling process, a resampling process is performed by an interpolation filter, referred to herein as a "resampler," to derive a single sample per symbol. Essentially, the resampler includes a bank of filters, each of which applies a different phase shift to the incoming samples. By tapping off the correct output, the resampler interpolates between the samples corresponding to a particular symbol, and it derives a symbol value that coincides roughly with the center point of the symbol. Thus, the resampler yields a single sample per symbol at the symbol rate, also referred to as the resampling rate.

In simplified terms, the resampler upsamples and then downsamples the incoming symbol samples. Thus, for example, if 2½ samples are taken per symbol, the resampler may upsample to, say, 20 samples per symbol. This is done by interpolating between the input samples. The upsampling is accomplished by a bank of filters, each of which applies a different phase shift to the data and outputs a different phase of the incoming data. One particular output is then selected as the resampled data, thus downsampling the data to result in a single sample per symbol.

This process results in phase differences between the resampling clock, used to drive a state machine in the resampler, and the receiver's symbol clock. These phase changes are unacceptable to subsequent demodulator processing elements, which are processing previous bursts that have been pipelined into the system. These processing elements may experience an extra clock edge or an edge may be dropped, for example, which causes their packet processing to become unsynchronized. Because of this occasional phase shift, one particularly troublesome feature of digital communication receivers has been achieving symbol synchronization (i.e., the process of synchronizing the transmitter symbol clock to the local symbol clock).

In accordance with various embodiments of the present invention, these phase changes are compensated for by clocking the resampled data into a buffer such as a RAM buffer using the resampling clock signal, and clocking the resampled data out of the RAM buffer using the receiver's symbol clock. This process is described in detail, below, in conjunction with FIGS. 1–4.

Figure 1:
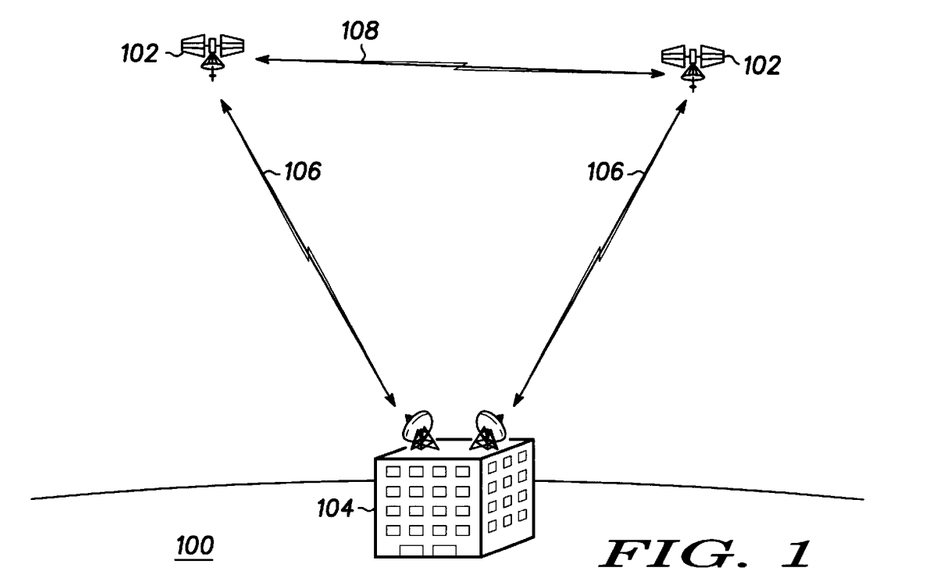
FIG. 1 illustrates a simplified block diagram of a satellite communications system in accordance with one embodiment of the present invention.

FIG. 1 illustrates a simplified block diagram of a satellite communications system 100 in accordance with one embodiment of the present invention. System 100 includes one or more satellites 102, and one or more ground stations 104. Ground stations 104 communicate with satellites 102 over wireless ground links 106. In one embodiment, satellites 102 also communicate with each other over a satellite cross link 108.

Satellites 102 could be low, medium or high earth orbiting satellites, for example, which move with respect to the surface of the Earth. Alternatively, satellites 102 could be geosynchronous satellites, which do not move significantly with respect to the Earth's surface.

In addition, satellites 102 could perform any of various types of applications. For example, satellites 102 may receive data from ground station 104 or from another satellite 102, and they may direct that information to one or more specific communication devices (e.g., cellular telephones or pagers). Alternatively, satellites 102 may broadcast that information toward one or more areas on the Earth's surface or elsewhere.

Ground station 104 may perform one or more functions. For example, ground station 104 can act as a switch that routes data between multiple satellites 102, or between satellites 102 and other networks (e.g., the Internet, LAN, WAN, PSTN and/or wireless networks). In addition or alternatively, ground station 104 can receive information regarding the health and topology of the satellite network, and it can provide tracking and control information to the satellites 102.

Information can be sent over ground links 106 or cross links 108 using any of several wireless communication protocols. For example, time division multiple access (TDMA) or other burst-oriented communication protocols may be employed. In order to send data from ground station 104 to a satellite 102, ground station 104 may multiplex the data with other data streams, and then modulate, upconvert, and transmit the data stream. Thus, the transmitted signal is an upconverted analog signal comprised of a single modulated stream of data, or multiplexed, modulated streams of data. At the satellite 102, the signal is downconverted and demodulated. The data can then be demultiplexed and consumed or, if necessary, upconverted and remodulated for transmission elsewhere.

When satellites 102 are non-geosynchronous (i.e., they change position with respect to the earth's surface), the apparent frequencies of signals received over ground links 106 and/or cross links 108 can be substantially affected by Doppler shifts. For example, if a satellite 102 is moving closer to ground station 104, a signal received by satellite 102 may appear to have a higher frequency than if the satellite 102 is moving away from ground station 104.

These shifts in the phase and frequencies of the signals cause the received data to be unsynchronized with the receiver's symbol clock. As mentioned previously, and as described in detail below, this problem is overcome using a symbol synchronizer that synchronizes received data with a symbol clock by rate buffering the output of a resampler, which forms a part of the receiver and demodulator.

FIG. 1 illustrates only two satellites 102 and one ground station 104. In other systems, more or fewer satellites 102 and more ground stations 104 may be present within the system. In addition, in various embodiments, system 100 may also include various other types of fixed or mobile communication devices (not shown), which communicate with satellites 102 and/or ground stations 104 over various wireless links. These other devices, for example, could include cellular base stations, radios, cellular telephones, pagers, aircraft communication equipment, and other mobile or fixed wireless communications devices.

In addition, some systems may not include cross links 108, and either ground links 106 or cross links 108 might be optical links. Finally, although the description refers to implementing the present invention in a satellite communications system, the present invention also could be implemented in other types of systems where frequency and phase differences exist between transmitted and received signals (e.g., terrestrial network or some other system).

Figure 2:
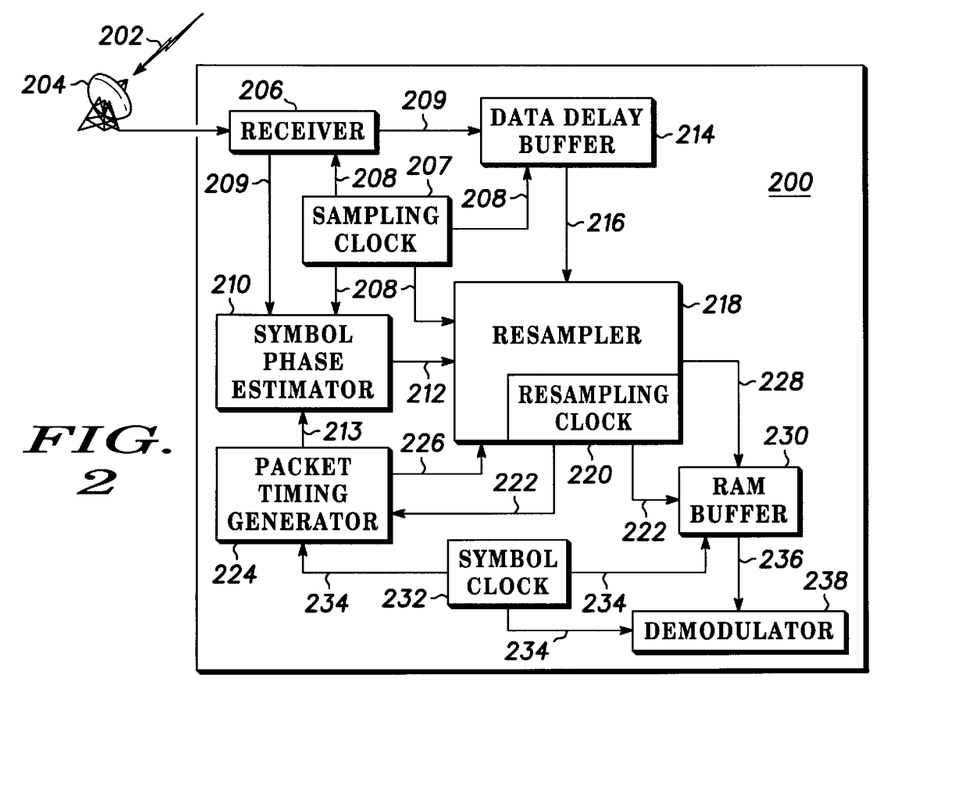
FIG. 2 illustrates a simplified block diagram of a symbol synchronizer in accordance with one embodiment of the present invention.

FIG. 2 illustrates a simplified block diagram of a symbol synchronizer in accordance with one embodiment of the present invention. In one embodiment, the synchronizer is located on board a satellite (e.g., satellite 102, FIG. 1), although it also may be located in a ground station (e.g., ground station 104) or in another mobile or fixed communication apparatus that receives modulated signals.

In one embodiment, system 200 receives signals 202 via an antenna 204. These signals 202 are then processed by receiver 206, symbol phase estimator 210, data delay buffer 214, resampler 218, packet timing generator 224, RAM buffer 230, and demodulator 238. Various components of the synchronizer also use clock signals produced by sampling clock 207, resampling clock 220, and symbol clock 232. Each of these components is discussed in detail below.

Initially, an RF, analog signal 202 is received from a signal source by antenna 204, which could be a phased array or directional antenna, in various embodiments. When system 200 is located on a satellite, the signal source could be another satellite or a fixed or mobile device on or near the surface of the earth, for example. Signal 202 could include various types of data, such as voice, messaging, telemetry and control messages, data packets, or other types of data. Signal 202 is a multiplexed, analog signal, which includes a stream of data in the form of symbols. Signal 202 is modulated at some carrier frequency into streams of symbols. For example, signal 202 could be modulated using QPSK, 16QAM, DPSK and/or some other modulation technique that carries a certain number of bits per symbol.

In one embodiment, symbols are multiplexed using a packet-oriented protocol, such as TDMA. Using TDMA, multiple packets of data may be transmitted within a single TDMA slot, or RF burst. During various timeslots, RF bursts, each including one or more packets, will be received at antenna 204.

Generally, the packet length is the same for each packet, and the burst length is the same for each burst. For example, a single burst may include 200 packets of the same length, although a burst could include more or fewer packets as well. Using TDMA, one or more packets from a particular user are received during a first timeslot, and packets from other users are received during subsequent timeslots.

A packet may include, for example, two or more asynchronous transfer mode (ATM) packets that are embedded into a longer TDMA burst. Typically, a long burst might include addressed data to several users. That data is grouped together with a packet header, packets are concatenated, and they are sent together in a longer burst. The methods and apparatus of the present invention apply to these longer bursts, and they could also apply to short bursts that are addressed to a single user.

In one embodiment, as will be described in more detail below, the perceived frequency at which signals are received continuously changes due to Doppler shifts and other phenomena, such as frequency variations of the signal source's clock. Accordingly, a phase estimate is performed for each packet, as described below, since a frequency shift may be experienced from packet to packet. In one embodiment, the packet length is kept relatively small compared to the burst length, so that the frequency change within a particular packet is not too great, and thus the packet's phase estimate is relatively accurate for the entire packet.

The received signal is initially processed by receiver 206. Receiver 206 downconverts the signal to baseband, filters the signal, and converts the signal to a digital format by sampling (e.g., using an A/D converter (not shown)). The A/D conversion is performed using a clock signal 208 produced by sampling clock 207.

Clock signal 208 is a uniform duty-cycle clock signal, in one embodiment. In addition, clock signal 208 is produced at a uniform rate, which is some rational multiple (e.g., 12/5) of the symbol rate. In one embodiment, the rational multiple is between 2 and 3, in order to keep the oversampling rate relatively low. Higher or lower multipliers could be used in other embodiments, however. Generally, a minimal amount of oversampling is desired in order to save power, among other things. The multiplier is a rational number, in one embodiment, because the symbol clock signal 234, described below, is generated by dropping out pulses of the sampling clock 207.

Receiver 206 produces a stream of complex symbol samples 209. Each sample 209 includes a real (i) and imaginary (q) portion, which represent the magnitude and phase, respectively, of a symbol sample. The symbol samples 209 are sent to data delay buffer 214 and symbol phase estimator 210.

Data delay buffer 214 receives and delays each symbol sample 209 before sending it to resampler 218. This delay is applied to the data in order to give symbol phase estimator 210 time to produce a phase estimate for an incoming packet of data before that data is resampled by resampler 218, as will be described in detail below. Accordingly, data delay buffer 214 produces delayed, complex symbol samples 216, which are identical to samples 209, except that they are delayed by a number of samples sufficient for the phase estimate to be generated.

Symbol phase estimator 210 generates a phase estimate 212 for each packet of received data. In other embodiments, symbol phase estimator 210 could generate a phase estimate 212 for sets of packets or all packets of a burst. Alternatively, symbol phase estimator 210 could generate multiple phase estimates 212 for each packet.

In one embodiment, symbol phase estimator 210 knows when each packet begins, because it receives a packet start estimate 213 from packet timing generator 224. Packet timing generator 224 determines the estimate 213 from a frame reference signal (not shown) and unique word indicator (not shown), in one embodiment, that packet timing generator 224 receives from other components of the system 200. The unique word indicator and frame reference signal indicate when each packet has arrived. In one embodiment, once system 200 receives a unique word on a burst, packet timing generator 224 tells symbol phase estimator 210 and resampler 218 where the starts of the next packets are.

Essentially, the symbol phase estimator 210 clocks in complex symbol samples 209 for each packet using sampling clock signal 208. Symbol phase estimator 210 then averages, over time, the complex symbol samples 209 for all or a portion of the packet. Symbol phase estimator 210 then compares that average with a local reference, which is derived from sampling clock 207, to determine a phase estimate 212 for the packet. Thus, essentially, the phase estimate 212 is the argument (i.e., phase) of the complex value resulting from correlating the received data 209 with a locally generated reference averaged over many samples. In other embodiments, other phase estimation approaches known to those of skill in the art could be used to generate phase estimate 212.

A particular packet contains multiple symbols, and the number of samples taken for the packet is approximately the number of symbols multiplied by the rational multiplier used to determine the sampling rate. For example, a packet may include 1000 symbols. If the rational multiplier is 2½, then the number of samples for the packet would be about 2500 samples.

As mentioned previously, symbol phase estimator 210 produces a phase estimate 212 for each packet. In one embodiment, phase estimate 212 is a digital number, represented by one or more bits, that indicates the estimated phase shift between 0 and 359 degrees. For example, phase estimate 212 could be represented by four bits, making it possible to indicate 16 incremental phase shifts between 0 and 359 degrees. In such a case, a digital "0000" might represent an in-phase condition, and a digital "0111" might represent a 180 degree, out-of-phase condition. Thus, each digital number would represent one of 16 symbol period units. More or fewer bits and increments could be used, in other embodiments.

The phase estimate 212 for each packet is provided to resampler 218, which uses the estimate to resample each symbol. Resampler 218 includes an interpolation filter and a resampling clock 220, in one embodiment. Essentially, resampler 218 takes the delayed, complex symbol samples 216, and produces a single complex sample 228 per symbol at an optimum sampling point.

In one embodiment, this is done by first upsampling to a higher rate. Upsampling is performed because the optimum sampling point may be between the samples 216 taken for a particular symbol. Upsampling is achieved by interpolating between the received samples 216 for each symbol. For example, if the sampling rate is 2½ times the symbol rate, and resampler 218 upsamples by a factor of 8, then resampler 218 would produce about 20 interpolated samples per symbol.

Resampler 218 receives a timing signal 226 from packet timing generator 224. The timing signal 226 tells resampler 218 when to use the phase estimate 212 that has been provided by symbol phase estimator 210.

Resampler 218 filters the interpolated samples to select one sample for the symbol at the optimum sampling point. Resampler 218 includes a bank of filters, where each filter applies a different phase shift to the input samples. In one embodiment, a phase detector is used to determine which filter output to use as the optimum symbol sample. In one embodiment, the output is commutated. Thus, one or more samples may be input into the filter bank, and a single sample is taken out. The resampler will change which filter the sample is taken out of in order to get the correct phase. Thus, by filtering the interpolated samples, resampler 218 essentially downsamples to the symbol rate. By performing this process, resampler 218 produces resampled data 228 at a rate of one sample per symbol.

Resampler 218 receives samples for each subsequent symbol in a certain pattern, which depends on the rational multiplier of the symbol rate used to sample the symbols. For example, resampler 218 may receive 2 samples for the first three symbols, then 3 samples for the fourth symbol, then 2 samples for the next three symbols, etcetera. Resampler 218 essentially functions as a state machine, where each state indicates which filter output to use for which phase of symbol clock 232. Based on phase estimate 212, resampler 218 goes into a certain state and begins clocking out samples 228. Resampler 218 will continue to clock out the samples until it receives a new phase estimate 212 for a new packet. At the start of the new packet, resampler 218 will then shift to the correct state at which to start for that packet based on the phase estimate 212, and the state machine will run in the preset pattern through the filter bank for the remainder of the packet period.

Resampler 218 also includes a resampling clock 220, which is synchronized, using the phase estimate 212, to the phase of the received symbols. The resampling clock signal 222 has a frequency at roughly the symbol rate, although it is adjusted for phase shifts caused by Doppler shifts or other phenomena. In one embodiment, resampling clock 220 changes its phase, in accordance with phase estimate 212, each time a new packet of data is received. That change in phase from packet to packet essentially looks like a frequency change, and resampling clock 220 is synchronized to these changing frequencies.

In one embodiment, the resampling clock signal 222 is also provided to packet timing generator 224. This tells packet timing generator 224 when symbol samples 228 are being clocked into RAM buffer 230, and thus enables packet timing generator 224 to provide a packet start indicator (not shown) that is inserted with the symbol samples 228 into RAM buffer 230. This indicator tells the rest of the system where the beginning of every packet is located.

Resampling clock signal 222 is a fixed-frequency signal over each phase estimate period, with an apparent frequency shift over each subsequent phase estimate period that has a different estimated phase from the previous period. Resampling clock signal 222 has a non-uniform duty cycle when the rational multiplier of the symbol rate used to generate the sampling clock signal 208 is a non-integer value. Because of the non-uniform duty cycle, resampling clock 220 produces a clock signal at varying periods of the sampling clock 207. Thus, resampling clock 220 may have rising edges, for example, at 2, 2, 2, 3, then 2 periods of sampling clock 207. Resampling clock signal 222 is generated, in one embodiment, by dropping out pulses of the sampling clock 207, as necessary.

The resampled data 228 is stored in RAM buffer 230, in one embodiment. RAM buffer 230 essentially synchronizes resampling clock 220 to symbol clock 232. This is done by clocking the resampled data 228 into RAM buffer 230 using resampling clock signal 222, and clocking the synchronized, resampled data 236 out of RAM buffer 230 using symbol clock signal 234.

RAM buffer 230 is a dual-port RAM, in one embodiment, which essentially functions as a circular buffer. In one embodiment, the size of RAM buffer 230 is such that it will be able to track the maximum anticipated amount of frequency shifts (e.g., due to Doppler shifts) over the length of each burst. By correctly sizing RAM buffer 230, underflow and overflow conditions are averted, where the read or write buffer pointers otherwise would override each other. In one embodiment, each time a new burst is received, the buffer pointers are reset to be half the distance of the RAM size apart.

In another embodiment, a set of D flip flops could be used rather than a dual-port RAM. The resampled data 228 would be clocked into and out of the set of D flip flops using multiplexers.

The synchronized, resampled data 236 includes complex symbol data that is clocked out of RAM buffer 230 and into demodulator 238 using symbol clock 232. Symbol clock 232 provides a fixed-frequency, non-uniform duty cycle clock signal 234 to demodulator 238, packet timing generator 224, RAM buffer 230, and other system components, such as interleavers, and modules that perform carrier acquisition and tracking, carrier offset measurement, data decision, forward error correction coding, and unique word detection, for example.

Similar to resampling clock 220, the symbol clock signal 234 has a non-uniform duty cycle when the rational multiplier of the symbol rate used to generate the sampling clock signal 208 is a non-integer value. Because of the non-uniform duty cycle, symbol clock 232 produces a clock signal at varying periods of the sampling clock 207 by dropping out pulses of the sampling clock 207, as necessary. Symbol clock 232 operates at essentially the same frequency as resampling clock 220. However, symbol clock 232 is in phase with sampling clock 207, whereas resampling clock 220 may not be. Thus, one advantage to the present invention is that it is not necessary to use any phase locked loops, VCOs or free-running oscillators that may cause interference with other system components.

Demodulator 238 receives and demodulates the synchronized, resampled data 236. In addition, in one embodiment, demodulator 238 performs unique word detection, carrier acquisition and tracking, data estimation, and forward error correction. Demodulator 238 also measures carrier offsets and generates other measurements, derivable from resampled data 236, that system 200 consumes.

The lack of phase synchronization between resampling clock 220 and symbol clock 232 is compensated for by using RAM buffer 230. By using RAM buffer 230 to synchronize the resampled data to the symbol clock 232, synchronized, resampled data 236 is fed to demodulator 238 at a correct and consistent frequency. Demodulator 238 receives and demodulates the resampled data 236, resulting in a stream of bits (not shown). Each complex symbol could be modulated into one or more bits of data, depending on the number of symbols represented in the modulation scheme.

In one embodiment, multiple packets (e.g., 3–4 packets) could be processed by system 200 in a pipelined manner. Therefore, while one packet may be being processed by certain system elements, one or more other packets may be being processed by other elements. Since the resampling clock 220 phase is governed by the phase estimates 212 for each packet, more or fewer samples may be clocked into resampler 218 than would be expected if no phase shifts occurred on the incoming signal. The discontinuity in the phases between subsequent packets would, without application of the embodiments of the present invention, cause processing elements that are processing earlier or later packets to mis-clock their data. Thus, by applying embodiments of the present invention, these phase discontinuities will not adversely affect the processing being performed by other processing elements.

Many of the components shown in FIG. 2 can be part of a single application specific integrated circuit (ASIC). For example, in one embodiment, symbol phase estimator 210, data delay buffer 214, resampler 218, packet timing generator 224, RAM buffer 230, demodulator 238, symbol clock 232, sampling clock 207, and various other components (not shown) are included in a single ASIC. In alternate embodiments, these components could be discrete and/or could be included on a field programmable gate array (FPGA) and/or in multiple, interconnected circuits.

Figure 3:
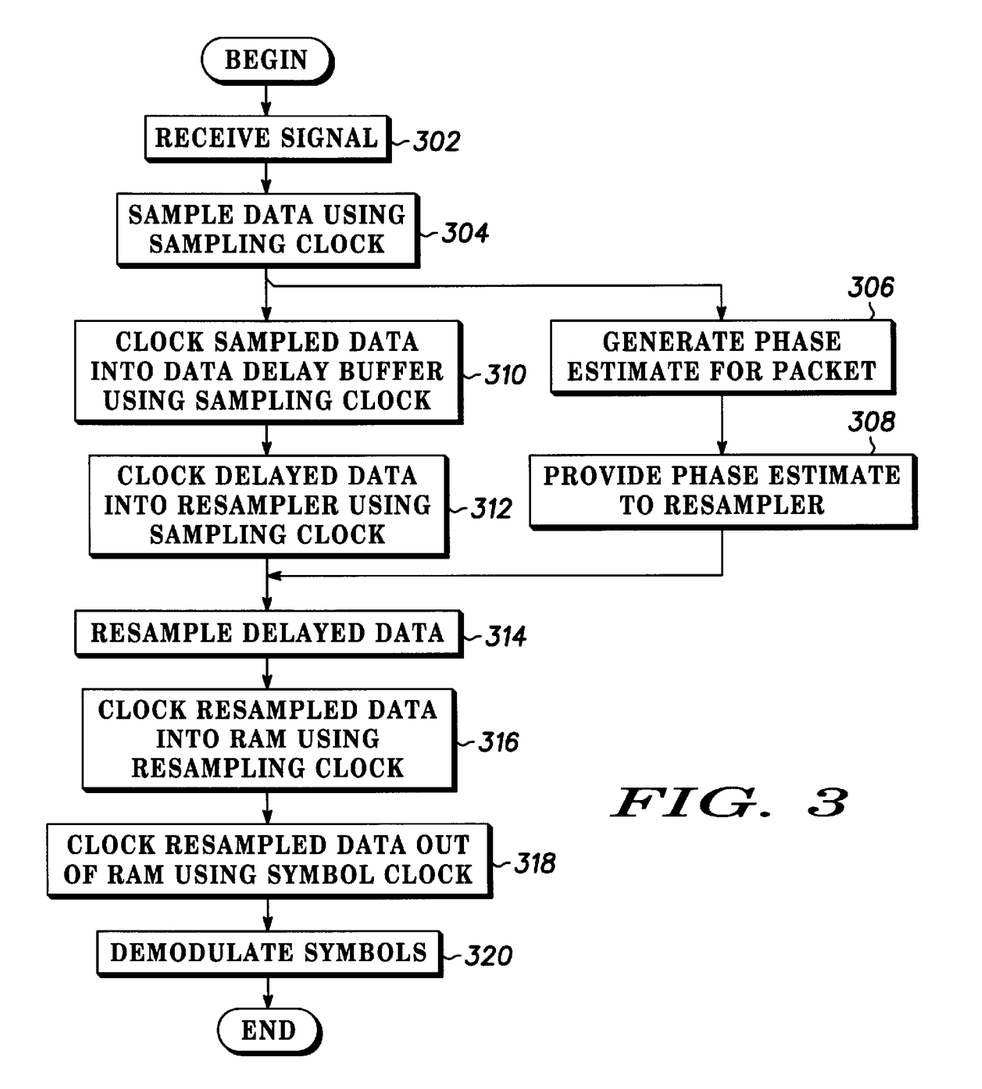
FIG. 3 illustrates a flowchart of a method for synchronizing received symbols with a receiver's symbol clock in accordance with one embodiment of the present invention.

FIG. 3 illustrates a flowchart of a method for synchronizing received symbols with a receiver's symbol clock in accordance with one embodiment of the present invention. The method illustrated in FIG. 3 could be performed by a system component such as the satellite illustrated in FIG. 2, in one embodiment. In other embodiments, the method could be performed by a fixed or mobile ground-based or airborne device or in a system other than a satellite communication system. The present invention could also be used in equipment and systems that utilize a combination of wireless and non-wireless technologies.

The method begins, in block 302, by receiving an analog signal (e.g., signal 202, FIG. 2), which includes a modulated stream of data in the form of symbols. The data is received in a burst of packets (e.g., using a TDMA protocol), where multiple symbols are included in each packet. The received signal is then sampled, in block 304, using a sampling clock that has a frequency at some rational multiple of the symbol rate. A sampling rate that is two or more times the symbol rate will result in multiple samples per symbol.

Figure 4:
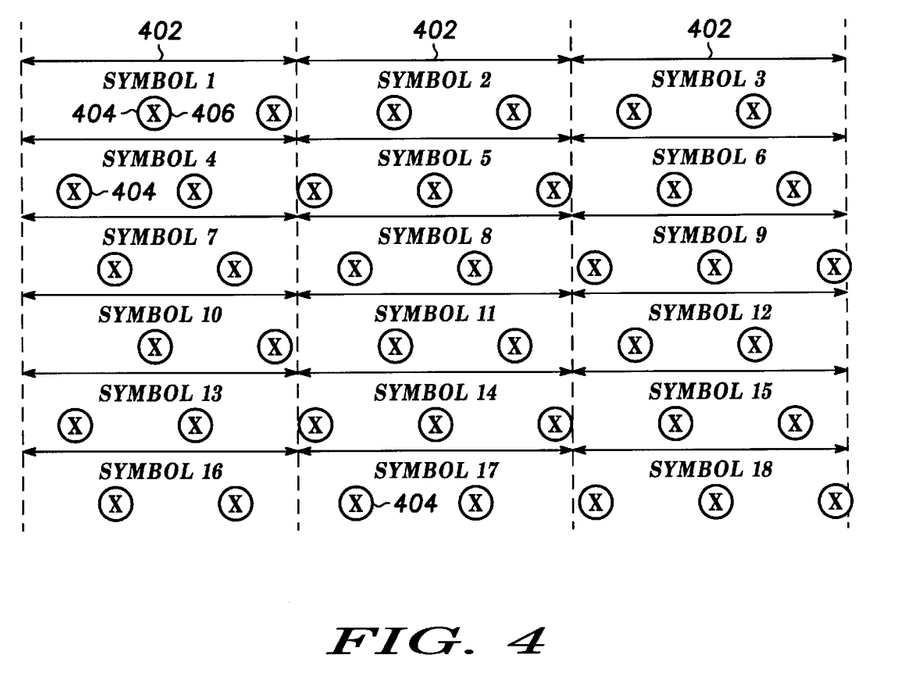
FIG. 4 is a diagram illustrating sampling timing for incoming symbols in accordance with one embodiment of the present invention.

FIG. 4 is a diagram illustrating sampling timing for incoming symbols, in accordance with one embodiment of the present invention. In the example shown, 18 symbols 402 are shown, which are received in sequence. Thus, the symbols shown in each successive row, starting from the top row, are received after the last symbol in the previous row.

Each double-sided arrow 402 represents a period of time within which a symbol is received, and each sample 404 is represented by an "X". In the example shown, 40 samples are taken during 18 symbols, and the sampling rate is approximately 2.2 (i.e., 40/18) times the symbol rate. Thus, at least two samples are taken for each symbol. In the example shown, two samples are taken during symbols 1–4, 6–8, 10–13, and 15–17, and three samples are taken during symbols 5, 9, 14, and 18.

Ultimately, the system requires a single sample per symbol, as described previously. A particular symbol is ideally represented by a sample taken at the midpoint of the symbol (e.g., sample 406). However, FIG. 4 illustrates that most samples 404 are not taken at the mid-point of each symbol 402. This lack of synchronization between the sampling clock and the incoming symbols is due, in part, to the fact that the sampling rate may be a non-integer multiple of the symbol rate. The lack of synchronization may also be due to frequency offsets due to a lack of synchronization between the transmitter and receiver symbol clocks, Doppler shifts, and/or other phenomena, as described previously.

Regardless of the cause, the lack of synchronization and the necessity for one sample per symbol makes a resampling process necessary. Referring back to FIG. 3, in one embodiment, resampling and synchronization are performed in blocks 306–318.

First, in block 306, a phase estimate is generated (e.g., by symbol phase estimator 210, FIG. 2) for each incoming packet of data. As described previously, the phase estimate is the argument (i.e., phase) of the complex value resulting from correlating the received data with a locally generated reference averaged over many samples. The phase estimate is provided to the resampler (e.g., resampler 218; FIG. 2), in block 308.

As a parallel process, the sampled data is clocked into a data delay buffer (e.g., buffer 214, FIG. 2) using the sampling clock, in block 310. A purpose of the data delay buffer, as described previously, is to give the phase estimator sufficient time to generate the phase estimate for the packet.

After such a sufficient delay, the delayed data is clocked into the resampler using the sampling clock, in block 312. The resampler then resamples the data, in block 314, using a resampling clock that is derived from the phase estimate. Basically, the resampler uses an interpolation filter to create a single, optimum sample for each symbol. As mentioned previously, the resampling clock produces a clock signal at the same frequency as the symbol rate, but the clock signal is phase shifted in order to ensure that optimum resampling is performed.

The resampled data is then clocked into a RAM using the resampling clock, in block 316. The RAM is a dual-port RAM, in one embodiment, which enables the resampled data to be synchronized with the receiver's symbol clock (i.e., the clock used by the demodulator and other components). After an amount of time that ensures that resampled data will be available for each symbol clock pulse, the resampled data is clocked out of the RAM using the symbol clock, in block 318. In this manner, the data is synchronized with the symbol clock, and the symbols can then be accurately demodulated, in block 320. The method then ends for that particular packet.

In one embodiment, multiple packets are processed in a pipelined manner. Therefore, while one packet may be being processed by certain blocks, described above, one or more other packets may be being processed by other blocks. By rate buffering the output of the resampler using the dual-port RAM, embodiments of the present invention provide a symbol synchronizer that synchronizes received data with the receiver's symbol clock. In addition, phase differences between the resampling clock and the receiver's symbol clock do not affect subsequent demodulator processing elements, which are processing previous bursts that have been pipelined into the system.

In the foregoing detailed description, reference is made to the accompanying drawings, which form a part hereof, and in which are shown by way of illustration specific embodiments in which the invention may be practiced. These embodiments are described in sufficient detail to enable those skilled in the art to practice the invention. The foregoing detailed description uses terms that are provided in order to make the detailed description more easily understandable. It is to be understood that these terms and the phraseology employed in the description should not be construed to limit the scope of the invention.

It will be understood by those skilled in the art that the operations of the methods shown and described herein can be carried out in a different order than those described with reference to the FIGS. It will also be understood that, while FIG. 3 has "Begin" and "End" blocks, in general the method that it depicts is continuously performed.

It will be further understood that the various elements illustrated in the drawings are merely representational and are not drawn to scale. Certain proportions thereof may be exaggerated, while others may be minimized. The drawings are intended to illustrate various implementations of the invention, which can be understood and appropriately carried out by those of ordinary skill in the art.

It will be appreciated by those of ordinary skill in the art that any arrangement, which is calculated to achieve the same purpose, may be substituted for the specific embodiment shown. For example, although the description refers to implementing the present invention in a satellite of a satellite communications system, the present invention also could be implemented in another system node, or a terrestrial network or some other system. The present invention has applicability in any system that experiences frequency fluctuations of incoming, symbol-oriented data.

This application is intended to cover any adaptations or variations of the present invention that fall within its scope. The foregoing detailed description, therefore, is not to be taken in a limiting sense, and it will be readily understood by those skilled in the art that various changes in the details, materials, and arrangements of the parts and operations which have been described and illustrated in order to explain the nature of this invention may be made without departing from the spirit and scope of the invention as expressed in the adjoining claims.

What is claimed is:

1. A method for synchronizing symbols transmitted within one or more packets that form a burst of radio frequency (RF) energy, the method comprising:
    sampling the symbols using a sampling clock, resulting in multiple complex symbol samples;
    generating a phase estimate from the multiple complex symbol samples, wherein the phase estimate indicates a phase shift between a local reference and the symbols;
    resampling the multiple complex symbol samples based on the phase estimate, resulting in resampled data that includes one sample per symbol;
    clocking the resampled data into a buffer using a resampling clock that is based on the phase estimate; and
    clocking the resampled data out of the buffer and into a demodulator.

2. The method as claimed in claim 1, wherein sampling the symbols comprises sampling the symbols at a sampling rate that is a rational multiplier of a symbol rate, resulting in at least two complex samples per symbol.

3. The method as claimed in claim 1, further comprising delaying the complex symbol samples before resampling the complex symbol samples.

4. The method as claimed in claim 3, wherein delaying the complex symbol samples comprises clocking the multiple complex symbol samples into a data delay buffer, and clocking the multiple complex symbol samples out of the data delay buffer after a period of time sufficient to generate the phase estimate.

5. The method as claimed in claim 1, wherein generating the phase estimate comprises determining an average of the multiple complex symbol samples over time, and comparing the average with the local reference.

6. The method as claimed in claim 1, wherein resampling the complex symbol samples comprises:
    upsampling the multiple complex symbol samples by interpolating between the complex symbol samples for each symbol, resulting in interpolated samples; and
    filtering the interpolated samples and selecting one sample for each symbol that coincides with an optimum sampling point, wherein the one sample is part of the resampled data.

7. The method as claimed in claim 1, further comprising changing a phase of the resampling clock, based on a new phase estimate, each time a new packet of data is received.

8. The method as claimed in claim 1, wherein clocking the resampled data comprises clocking the resampled data into a dual-port random access memory (RAM) using the resampling clock.

9. The method as claimed in claim 8, further comprising resetting a write buffer pointer and a read buffer pointer each time a new burst is received.

10. The method as claimed in claim 1, wherein clocking the resampled data out of the buffer comprises generating the receiver's symbol clock by dropping pulses from the sampling clock.

11. The method as claimed in claim 1, further comprising demodulating the resampled data.

12. The method as claimed in claim 1, wherein the method is performed by a system node that moves with respect to a transmitter that transmitted the symbols, and the phase shift varies based on Doppler shifts.

13. A symbol synchronizer that synchronizes symbols transmitted within one or more packets that form a burst of radio frequency (RF) energy, the symbol synchronizer comprising:
    a receiver that samples the symbols using a sampling clock, resulting in multiple complex symbol samples;
    a symbol phase estimator, coupled to the receiver, that generates a phase estimate from the multiple complex symbol samples, wherein the phase estimate indicates a phase shift between a local reference and the symbols;
    a resampler, coupled to the symbol phase estimator, that resamples the multiple complex symbol samples based on the phase estimate, resulting in a set of symbol samples;
    a buffer, coupled to the resampler, into which the set of symbol samples is clocked using a resampling clock that is based on the phase estimate; and
    a symbol clock, coupled to the buffer, that clocks the set of symbol samples out of the buffer and into a demodulator.

14. The symbol synchronizer as claimed in claim 13, further comprising a packet timing generator, coupled to the symbol phase estimator, that determines an estimate of a packet start time and sends the estimate to the symbol phase estimator.

15. The symbol synchronizer as claimed in claim 13, further comprising a data delay buffer, coupled to the receiver and the resampler, that delays the multiple complex symbol samples for a period of time sufficient to generate the phase estimate before resampling the multiple complex symbol samples.

16. The symbol synchronizer as claimed in claim 13, wherein the buffer is a dual-port random access memory (RAM).

17. A satellite within a satellite communications network that receives symbols transmitted within one or more packets that form a burst of radio frequency (RF) energy, the satellite comprising:
 a receiver that samples the symbols using a sampling clock, resulting in multiple complex symbol samples;
 a symbol phase estimator, coupled to the receiver, that generates a phase estimate from the multiple complex symbol samples, wherein the phase estimate indicates a phase shift between a local reference and the symbols;
 a resampler, coupled to the symbol phase estimator, that resamples the multiple complex symbol samples based on the phase estimate, resulting in a set of symbol samples;
 a buffer, coupled to the resampler, into which the set of symbol samples is clocked using a resampling clock that is based on the phase estimate; and
 a symbol clock, coupled to the buffer, that clocks the set of symbol samples out of the buffer and into a demodulator.

18. The satellite as claimed in claim 17, further comprising a packet timing generator, coupled to the symbol phase estimator, that determines an estimate of a packet start time and sends the estimate to the symbol phase estimator.

19. The satellite as claimed in claim 17, further comprising a data delay buffer, coupled to the receiver and the resampler, that delays the multiple complex symbol samples for period of time sufficient to generate the phase estimate before resampling the multiple complex symbol samples.

20. The satellite as claimed in claim 17, wherein the buffer is a dual-port random access memory (RAM).

* * * * *